United States Patent

Takata

[11] Patent Number: 5,309,781
[45] Date of Patent: May 10, 1994

[54] STEPLESS SPEED CHANGE GEAR

[76] Inventor: Nobuo Takata, 87, Kurotani 5-chome, Yao-shi, Osaka 581, Japan

[21] Appl. No.: 969,264
[22] PCT Filed: Jun. 1, 1992
[86] PCT No.: PCT/JP92/00719
§ 371 Date: Jan. 19, 1993
§ 102(e) Date: Jan. 19, 1993
[87] PCT Pub. No.: WO92/21895
PCT Pub. Date: Dec. 10, 1992

[30] Foreign Application Priority Data

Jun. 3, 1991 [JP] Japan .................. 3-131332

[51] Int. Cl.$^5$ ............................. F16H 29/08
[52] U.S. Cl. ........................ 74/119; 192/45
[58] Field of Search .......... 74/118, 119, 834; 192/45

[56] References Cited

U.S. PATENT DOCUMENTS

| 954,384 | 4/1910 | Fellows | 74/119 |
| 1,201,125 | 10/1916 | Weeks | 74/119 |
| 1,401,538 | 12/1921 | Kessler | 74/119 |
| 2,935,385 | 5/1960 | Cornelison | 74/119 X |
| 3,557,921 | 1/1971 | Takada | 192/45 |
| 5,035,309 | 7/1991 | Takada | 192/45 |

FOREIGN PATENT DOCUMENTS

| 34-3793 | 3/1959 | Japan . | |
| 48-68961 | 9/1973 | Japan . | |
| 60-125454 | 7/1985 | Japan . | |
| 383124 | 12/1964 | Switzerland | 74/119 |
| 27553 | of 1908 | United Kingdom | 74/119 |
| 326297 | 3/1930 | United Kingdom | 74/119 |

Primary Examiner—Allan D. Herrmann
Attorney, Agent, or Firm—Jordan and Hamburg

[57] ABSTRACT

A stepless speed change gear that is small in size, light in weight, simple in construction, secure in operation, long in service life and capable of high-output speed changes. An input shaft crank (3) and an input side member (4) are mounted on an input shaft (1) and an output shaft (2) via a one-way clutch mechanism (100), respectively, and the respective members are coupled to each other by means of an input connecting rod (5) and an output connecting rod (6). Also, a speed-change link (7) is coupled to a junction point (B) of these links at one end thereof, and the other end thereof (Q) is allowed to move to any position within a certain range and to be fixed at that point. Also, the one-way clutch is a rolling bearing clutch. Variable speed change can securely be obtained with a simple mechanism. In a case where the rolling bearing clutch is used, high-output speed change is possible with the stepless speed change gear that is small in size and light in weight.

3 Claims, 9 Drawing Sheets

STEPLESS SPEED CHANGE GEAR

BACKGROUND OF THE INVENTION

The present invention relates to a stepless speed change gear using one or more one-way clutches.

There have been many kinds of stepless speed change gears according to the prior art such as a chain drive type, a traction drive type, a slide coupling type and so on including a one-way clutch type as illustrated in FIG. 17.

In the stepless speed change gear shown in FIG. 17, a speed change link 7' having a movable support point Q' is connected to a transmission link 5' which is connected to an input shaft 3' and an input side member 4' which rotates about a center p' of an output shaft of a one-way clutch. However, such a stepless speed change gear is insufficient in link mechanism and can be used only for transmission of small power.

There are problems in the other type of stepless speed change gears such as the traction drive type, etc. that not only they have large transmission loss but also they have large size, heavy weight and complicated construction.

SUMMARY OF THE INVENTION

To solve the above mentioned problems in the prior art, the present invention intends to provide a stepless speed change gear of simple construction with reliable action, small size and light weight and suitable for transmitting even large power.

To achieve the above object, a stepless speed change gear according to the first invention is characterized to comprise: an input shaft; an input shaft crank being fitted to the input shaft to a right angle direction and being provided with a connecting part; an input connecting rod being connected to the connecting part at one end side and being provided with the other end side connecting part; an output connecting rod being connected to the other end side connecting part at one end side and being provided with the other end side connecting part; a one-way clutch to transmit torque to one direction only and being provided with an output shaft disposed in the same direction to the input shaft and an input side member being connected to said the other end side connecting part of the output connecting rod at one end side swingably about a center of the output shaft; a speed change link being connected to the other end side connecting part of the input connecting rod at one end side and being positioned at an optional position in a given moving range at the other end side; fixing means to fix the other end side of the speed change link; the input connecting rod, the output connecting rod, the input side member and the speed change link being swingable in each plain a direction of which is the same as a direction of rotation of the input shaft crank.

In addition to the above features, a stepless speed change gear according to the second invention is characterized in that the speed change link is provided with a second connecting part at the one end side and the output connecting rod is connected to the second connecting part at the one end side instead of connected to the other end connecting part of the input connecting rod.

In addition to the features of the first invention, a stepless speed change gear according to the third invention is characterized in that a disk-like member being fixed to the input shaft at an eccentric position and a rotating member being supported rotatably on a circumferential surface of the disk-like member are comprised instead of the input shaft crank and the input connecting rod.

In addition to the features of the first invention, a stepless speed change gear according to the fourth invention is characterized in that the other end side of the speed change link moves a given locus range from a position where the output connecting rod becomes orthogonal to both the speed change link and the input side member to a position where the output connecting rod and the speed change link line up in a straight line.

In addition to the features of the first invention, a stepless speed change gear according to the fifth invention is characterized in that the one-way clutch is a rolling bearing clutch comprising an inner rotation body, an outer rotation body, a plurality of intermediate rotation bodies and energizing means; the inner rotation body is provided with an inner raceway surface of a mono-hyperboloid of revolution about an axis of the output shaft; the outer rotation body is provided with an outer raceway surface of a mono-hyperboloid of revolution about the axis; the inner rotation body and the outer rotation body are facing each other to form a raceway; the intermediate rotation bodies have cylindrical rolling surfaces and are disposed in the circumferential direction of the raceway with their center lines slanting at a predetermined angle to a section including the axis; the surface of each intermediate rotation body contacts in line with the inner and outer raceway surfaces; the energizing means energize either the inner rotation body or the outer rotation body in the direction of the axis to narrow the spacing of the raceway; the inner and outer rotation bodies are provided with an annular member at opposite side in the axis which brings the movement of the intermediate rotation bodies in the axis direction to a stop; the outer rotation body is connected to the input side member so that both rotate in one body; the inner rotation body is connected to said output shaft so that both rotate in one body.

With the stepless speed change gear according to the first invention, the rotation of the input shaft is transmitted to the input connecting rod of which the other end side connecting part is connected to the speed change link which is positioned by the fixing means at the other end side and is swinged about the fixed point. This movement of the other end side connecting part of the input connecting rod is transmitted to the input side member of the one-way clutch via the output connecting rod, which swings the input member about the output shaft as the center. As a result, the output shaft is rotated intermittently under the function of the one-way clutch mechanism. In this case, by transferring the position of the fixed point of the speed change link, the direction of the swing motion is changed, which changes the width of swing of the input side member. Thus, the speed change ratio is altered. And, as the speed change link can be fixed at the optional point of given movable range by the fixing means, the above speed transmission is stepless.

Further, although the rotation of the output shaft transmitted via the input side member and the one-way clutch mechanism is intermittent, it can be smoothed by using a plurality of the one-way clutches or by installing a flywheel. Furthermore, one or more gears for increasing or decreasing speed may be installed additionally to obtain the desired maximum or minimum speed change ratio.

With the stepless speed change gear according to the second invention, since the speed change link is provided with the second connecting part at its one end side and the one end side of the output connecting rod is connected to the second connecting part, while the other end side connecting part of the input connecting rod is connected to a different point of the speed change link excepting the second connecting part, different displacement is transmitted to the output connecting rod than that of the input connecting rod.

With the stepless speed change gear according to the third invention, since the rotating member is supported rotatably on the circumferential surface of the disk-like member, the center of the rotating member moves like a crank pin when the input shaft is rotated. As a result, the other end side connecting part of the rotating member swings the speed change link, whereby the output connecting rod makes reciprocating motion. This motion is transmitted to the one-way clutch which rotates the output shaft at a changed speed same as the first invention.

In the stepless speed change gear according to the fourth invention, when the other end side of the speed change link is positioned where the output connecting rod becomes orthogonal to both the speed change link and the input side member, the swing width of them become maximum, which gives the maximum speed of the output shaft. On the other hand, when the other end side of the speed change link is positioned where the output connecting rod and the speed change link line up in a straight line, the axial movement of the output connecting rod becomes minimum, which gives the minimum speed of the output shaft. In this case, when the length of the speed change link and the output connecting rod are the same, the swing amount of the input side member become 0 and stopping condition of the output shaft can be realized. Since the other end side of the speed change link is moved in the range as mentioned above, the speed of the output shaft from maximum to minimum can be obtained effectively.

With the stepless speed change gear according to the fifth invention, since the rolling bearing clutch is used as the one-way clutch, its excellent performance is utilized for the stepless speed change gear as follows:

As the inner and outer raceway surfaces are both monohyperboloid of revolution, the raceway formed by them has the diameter enlarging from one end to the other end. And, a plurality of intermediate rotation bodies are disposed slanting to the axis section. Therefore, when the swing of the outer rotation body (hereafter called ∠outer ring∠) caused by the rotation of the input shaft crank is free rotation side, the intermediate rotation bodies roll on the inner and outer raceway surfaces, being guided by them and keeping line contact with them. However, since the advancing direction of the intermediate rotation bodies to the inner raceway surface is opposite to the advancing direction of the intermediate rotation bodies to the outer raceway surface, the inner rotation body (hereafter called ∠inner ring∠) and the outer ring are forced to remove each other in their axial direction which widens the raceway distance.

On the other hand, since the energizing means energize either the inner ring or the outer ring in the direction to narrow the spacing of the raceway, the inner ring and the outer ring face each other in their radial direction without separating, under receiving the removing force and the energizing force at the same time. Thus the inner and outer rings rotate relatively via the intermediate rotation bodies. Therefore, the rotation of the input shaft is not transferred to the output shaft, which do not rotate it in this direction of the swing.

Contrary to the above, when the rotation of the outer ring caused by the rotation of the input shaft crank is the clutching side, in addition to be energized by the energizing means, the inner ring or the outer ring is moved to the direction to narrow the spacing of the raceway, by the movement of the intermediate rotation bodies which is contrary to the above. As a result, the intermediate rotation bodies work as sprags between the inner and outer ring, which generates instantaneous clutching action. Thus the rotation of the input shaft crank is transmitted to the output shaft through the rolling bearing clutch and the output shaft rotates at the changed speed.

In the above rolling bearing clutch, unified load distribution is achieved between the inner ring or the outer ring and the intermediate rotation bodies due to stable line contact between them. Accordingly, it works as the excellent roller bearing in the free rotation, while it generates large clutching force by the wedge effect of the intermediate rotation bodies in the reverse rotation. Further, since the intermediate rotation bodies are aligned automatically in the raceway, uniform load distribution is maintained for variation of miscellaneous conditions such as deformation of the clutch, wear of the raceway surfaces and dimentional accuracy. Furthermore, as on/off action of the clutch is carried out mainly by rolling of the intermediate rotation bodies, such excellent performances are obtained that stable action is maintained as a clutch in frequent repetitions of on/off motion, long service life is ensured for large rated load and transmission of high output is available.

BRIEF DESCRIPTION OF THE DRAWINGS

FIG. 10 is an explanatory drawing of a method to direct force acting on a supporting point for speed change to an input shaft;

DETAILED DESCRIPTION OF THE PREFERRED EMBODIMENTS

Figure 1:
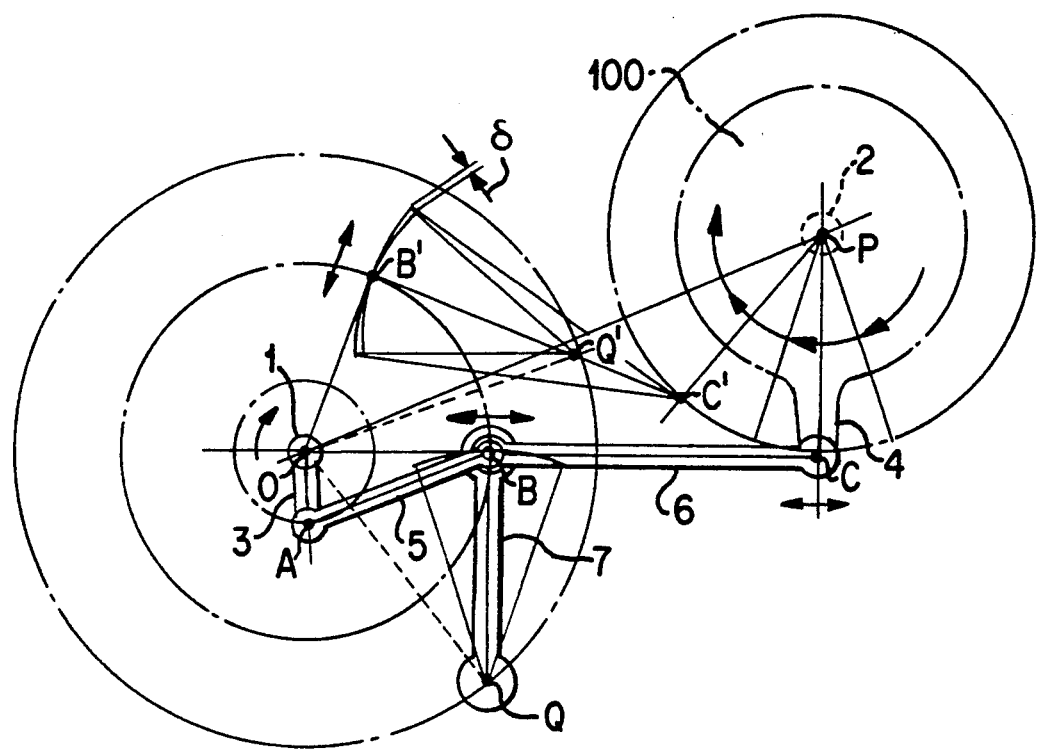
FIG. 1 is an explanatory drawing of a mechanism of a stepless speed change gear of an illustrative embodiment.

FIG. 1 shows mechanism of a stepless speed change gear of one preferable embodiment.

An input shaft crank 3 and an input side member 4 via a one-way clutch 100 are fitted respectively at an input shaft 1 and an output shaft 2 which are at a right angle to this sheet, and also they are connected to each other by links of an input connecting rod 5 and an output connecting rod 6. A speed change link 7 which is positioned at an optional position Q in a given moving range is connected to the connecting point B of the input and output connecting rods 5 and 6. The connecting parts of the connecting points A, B, C of the crank and links are pin joints by which the input shaft crank 3, the input side member 4, the input connecting rod 5, the output connecting rod 6 and speed change link 7 are rotatable or swingable in the same direction plane which are at right angles to the input shaft 1 and the output shaft 2.

In these mechanism, when the input shaft 1 is rotated, the point B swings to the direction shown by the arrow in the figure about the point Q as the center by the movement of the input connecting rod 5 and the speed change link 7. The swing of the point B is transmitted to the point C via the output connecting rod 6, which swings the input side member 4 about the point P as the center and rotates the output shaft 2 intermittently under the function of the one-way clutch 100. In the drawing, since the output connecting rod 6 is at right angles to both the input side member 4 and the speed change link 7, the rotating speed of the output shaft 2 becomes maximum, giving maximum transmission ratio.

To change the transmission ratio, the point Q is moved and stopped again at another position. The moving range for transmission may be the range in which such mechanism can be operated. Accordingly, the locus of the moving range may be such curve as a circular arc, a straight line etc.. In the embodiment, the point Q is moved on the circular arc having the center O from the view point of ease of manufacturing.

When getting the minimum transmission ratio, the swing center point Q of the speed change link 7 is turned around the center O of the input shaft crank 3 until it reaches the point Q'. Although width or speed of swing of the point B does not change in the movement, the component to swing the point C in the swing width of the point B changes corresponding to the movement of the point Q. And finally, when each point Q, B and C reaches to each point Q', B', and C' where the point B', C' and Q' line up in a straight line, the rotating speed of the output shaft 2 becomes minimum. In this case, the swing width of the outer circumference C' of one-way clutch 100 which is swing by the swing of the point B' via the output connecting rod 6 is δ as shown in FIG. 1. This δ is produced by the difference of the radius of curvature between the speed change link 7 and the output connecting rod 6. However, as this δ is a very small value, the minimum transmitted speed becomes almost 0. Therefore, by adopting the output connecting rod 6 and the speed change link 7 having the same length, the complete 0 transmission in which δ and the movement of the point C become 0 can be attained.

By this transmission mechanism, changed speed from 0 a predetermined value can be obtained without any step. Further, the transmitted speed from 0 to desired speed can freely obtained by installing, for example, one or more gears for increasing or decreasing speed.

Furthermore, although such output rotation using one-way clutch 100 is intermittent, there is no problem for practical use, because, such method as to make the device multi-stage by providing a plurality of one way clutches or installing a inertia equipment such as a flywheel may be adopted.

Figures 2A, 2B:
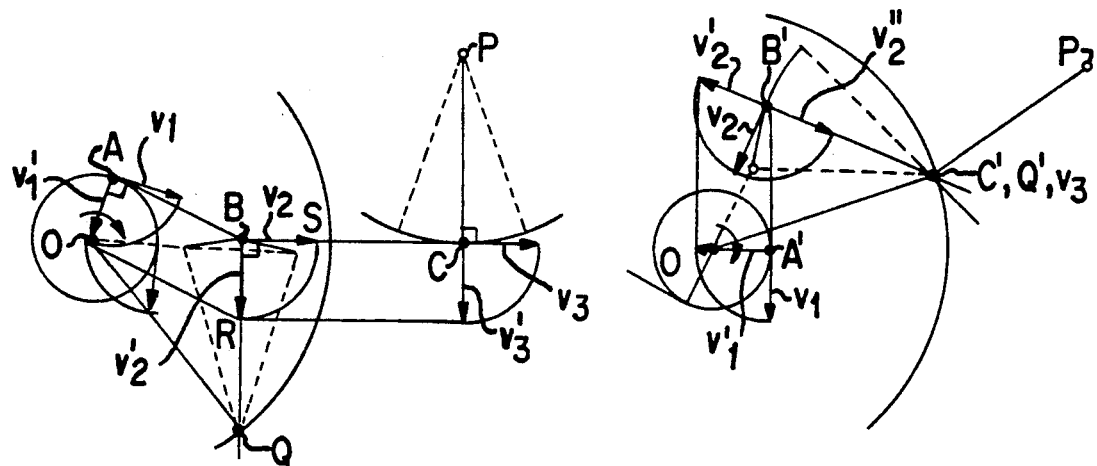
FIG. 2(a), (b) are explanatory drawings of relation of changing speed of the stepless speed change gear.

FIGS. 2(a), (b) are explanatory drawings of relation of changing speed.

If the rotating speed of the input shaft crank 3 is constant, circumferential speed $V_1$ of the point A is constant. Both figure (a), (b) show positions of the point A and A' of the input shaft crank 3 wherein the speed of the point B and B' becomes maximum. And (a) shows the condition of the speed change when each point O, B, and C line up in a straight line and the point Q and P are both on the perpendicular of the straight line OBC, resulting in the maximum speed of the output shaft 2. On the other hand, (b) shows the condition of the speed change when each point B', Q' and C' lines up in a straight line and the point Q' corresponds to the point C, in which the speed of the output shaft 2 becomes 0. In the figures, rotation method is used for speed conversion of the circumferential speed $V_1$ of the point A.

In FIG. 2(a), the circumferential speed $V_1$ is converted from the point A to point B as follows; get $V_1 = V_1'$ by turning $V_1$ to the direction AO; get cross point R on the segment BQ by drawing the parallel line to the line AB which starts from the extremity of the vector $V_1'$; get cross point S by turning the vector $V_2'$ 90° and get the segment BS as the vector $V_2$ of the point B. Further, since the segment BC and PC cross at a right angle, circumferential speed of the point C is the same to that of the point B in the direction and dimensions, which gives the speed vector $V_3 = V_2$. As a result, if there is no energy loss in the output side including the one way clutch 100, the output shaft 2 rotates with the maximum circumferential speed $V_3$ at the point C by the given input speed $V_1$.

In FIG. 2(b), also the vector speed $V_2$ of the point B' is obtained by rotation and conversion of $V_1 \rightarrow V_1' \rightarrow V_2' \rightarrow V_2$ similarly as mentioned above. In the point C', as the vector $V_2$ is directing to the straight line B' C' at a right angle, the vector $V_3'$ corresponding to the vector $V_3$ does not exist. Accordingly, there is no input to the one-way clutch, making the rotation of the output shaft 0.

As described above, when the point Q is transferred to the point Q' by rotation, the circumferential speed of the input side member 4 of the one-way clutch changes from $V_3$ to 0. Therefore, the speed of the output shaft 2 can be changed steplessly from $V_3$ to 0 by making it possible to stop the point Q of the speed change link 7 at any point in its movable range.

Figure 3:
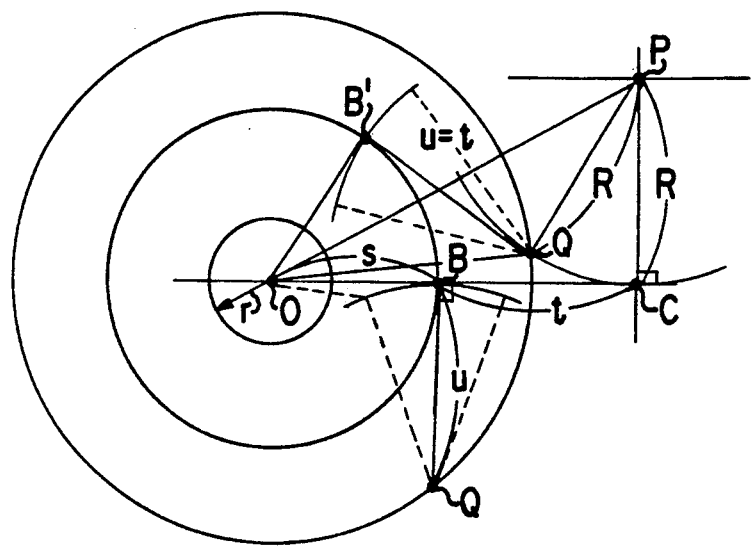
FIG. 3 and FIG. 4 are explanatory drawings to get conditions for stable operation of the stepless speed change gear.

Now, conditions are derived so that the link mechanism work stably by FIG. 3.

As shown in FIG. 3, notations are given as follows: r as the radius of the input shaft crank 3; s as the distance between the shaft center of the input shaft 1 and the swing center B of the speed change link 7; t as the length of the output connecting rod 6; u as the length of the speed change link 7; and R as the radius of rotation of the input side member 4. The point Q or Q' shows the position when the output shaft 2 reaches maximum speed or minimum speed (changed speed 0) respectively. The conditions to get maximum speed are that both the angle OBQ and OCP become right angles. The changed speed 0, the following equation is derived to avoid unstable operation when the angle B' Q' P is nearly 180°;

$$\overline{OP} \leq \overline{OQ'} + R \tag{1}$$

and, from the triangle OPQ and OB' Q';

$$\left. \begin{array}{l} \overline{OP} = \sqrt{(s + t)^2 + A^2} \\ \overline{OP} = \sqrt{s^2 + t^2} = \sqrt{s^2 + u^2} \end{array} \right\} \tag{2}$$

then, from the equation (1) and (2), as the relations between s, t, u, R;

$$\left. \begin{array}{l} s \leq Rt \sqrt{1/(t^2 - R^2)} \\ s \leq Ru \sqrt{1/(u^2 - R^2)} \quad (u = t) \end{array} \right\} \tag{3}$$

can be introduced. Therefore, if these relations are satisfied, the operation of the stepless speed change gear is stabilized.

Figure 4:
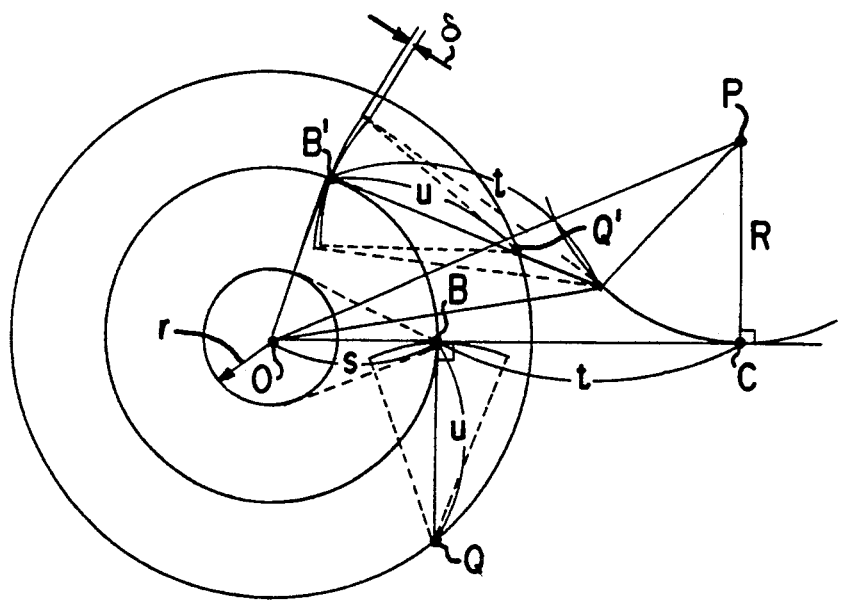

FIG. 4 shows a case when u≠t. Although it is preferable to be u=t in principle, there will be the case that the dimensional difference must be provided between u and t for the convenience of the design and manufacture. In this case, as shown in the FIG. 4, the error δ comes out due to the radial difference of the rotation between u and t, which causes the problem that the rotating speed of the output shaft 2 does not become completely 0.

Figure 5:
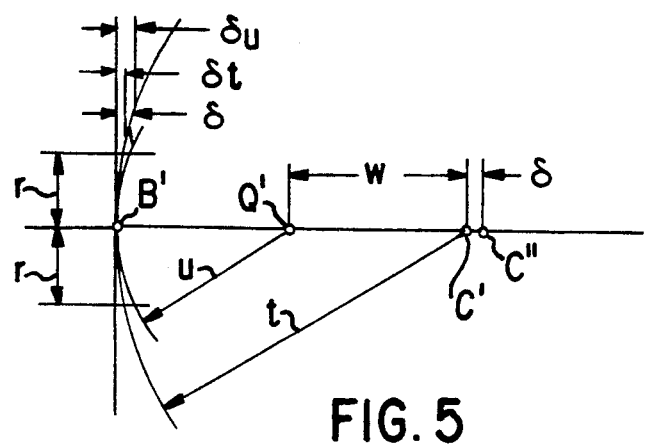
FIG. 5 is an explanatory drawing to get an error $\delta$ at u≠t in the stepless speed change gear.

FIG. 5 is a drawing to calculate the error δ. In the drawing, notation w means the distance from the swing center Q' of the speed change link 7 to the connecting point C' of the input side member 4 and the output connecting rod 6, that is, the difference of the radius of rotation between the output connecting rod 6 and the speed change link 7, and, notation δu or δt means the axial displacement of the point where is in the distance r from the swing center B'. Then δ is calculated as follows;

$$\begin{array}{rl} \delta u & = u - \sqrt{u^2 - r^2} \\ \delta t & = t - \sqrt{t^2 - r^2} \\ \delta & = \delta u - \delta t = u - t - \sqrt{u^2 - r^2} + \sqrt{t^2 - r^2} \\ & = \sqrt{(w + u)^2 - r^2} - (w + \sqrt{u^2 - r^2}) \end{array} \tag{4}$$

The value of δ obtained by the equation (4) is very small when w is small. Accordingly, when rolling bearing clutch is used as the one way clutch 100, since the clutch has characteristics as torsion spring for transmission torque the error δ is absorbed by the torsional angle produced between the input side member 4 and the output shaft 2, achieving the stepless speed change up to 0 without rotating the output shaft 2 substantially.

Figure 6:
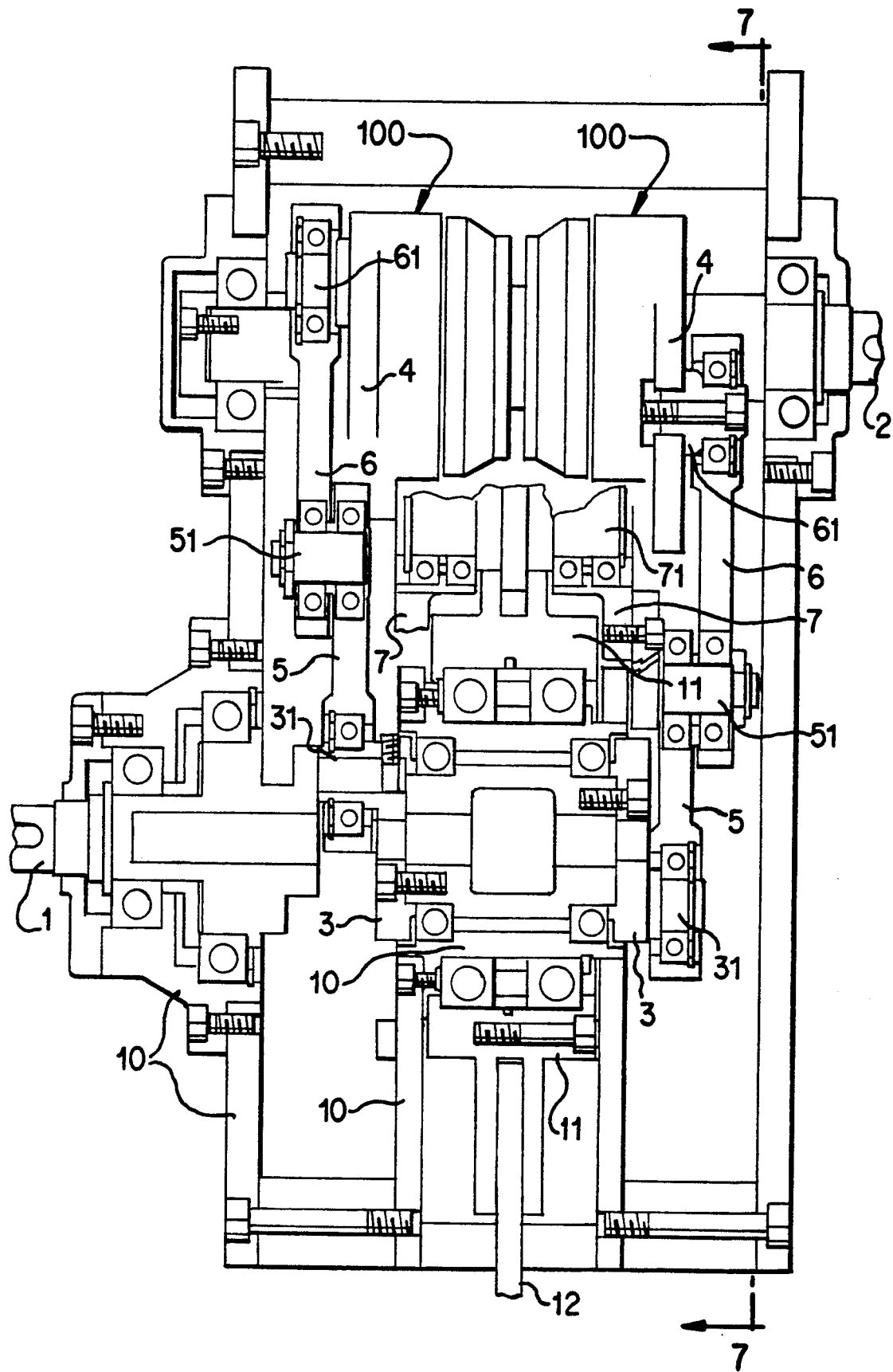
FIG. 6 is a sectional view showing an example of construction of the stepless speed change gear.
Figure 7:
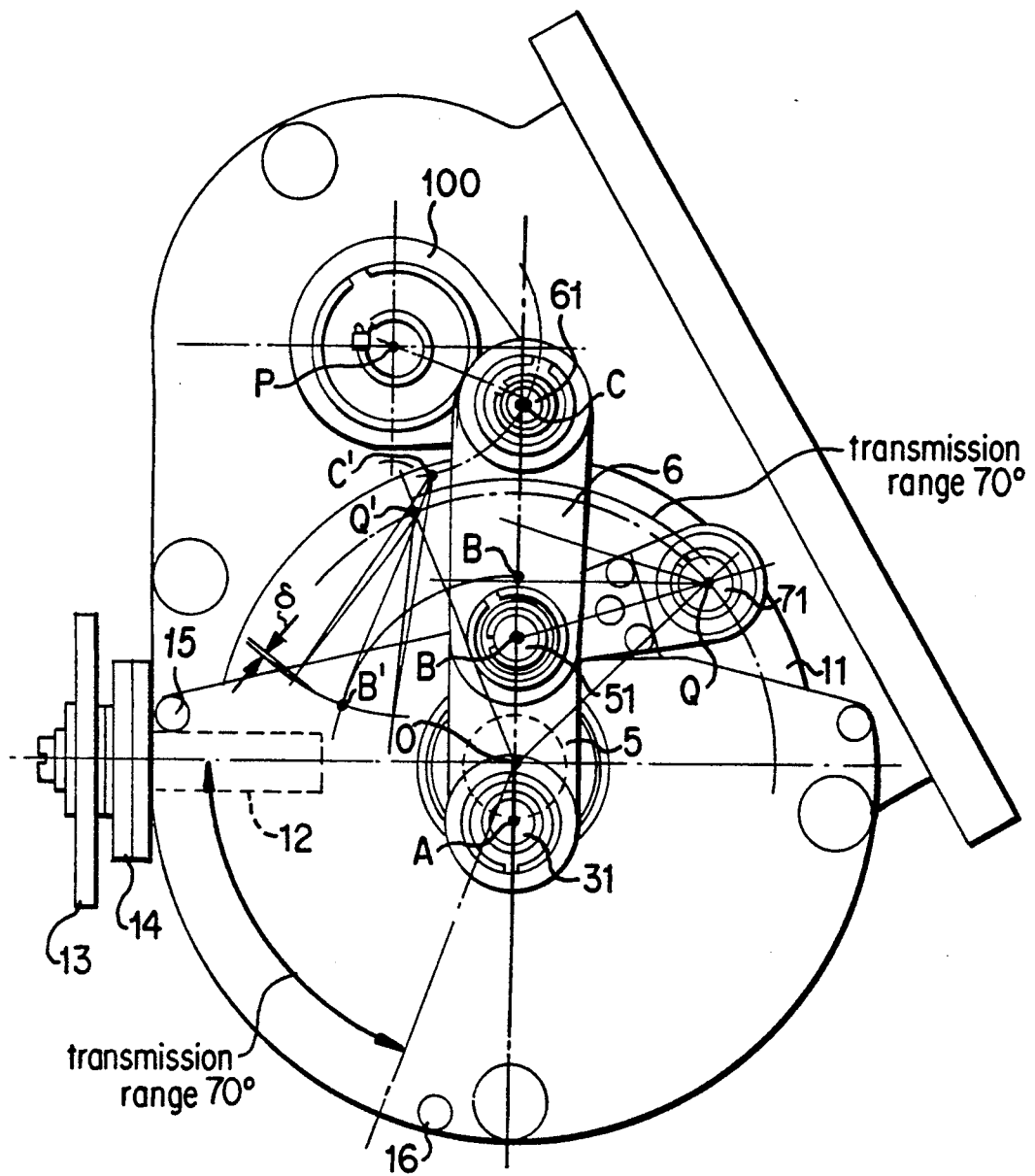
FIG. 7 is a 7—7 line sectional view of FIG. 6.

FIGS. 6 and 7 show an example of the construction of the embodiment of the stepless speed change gear, wherein FIG. 6 is a sectional view and FIG. 7 is a side view.

The gear in this example is a type wherein two rows of rolling bearing clutches are arranged.

Figure 8:
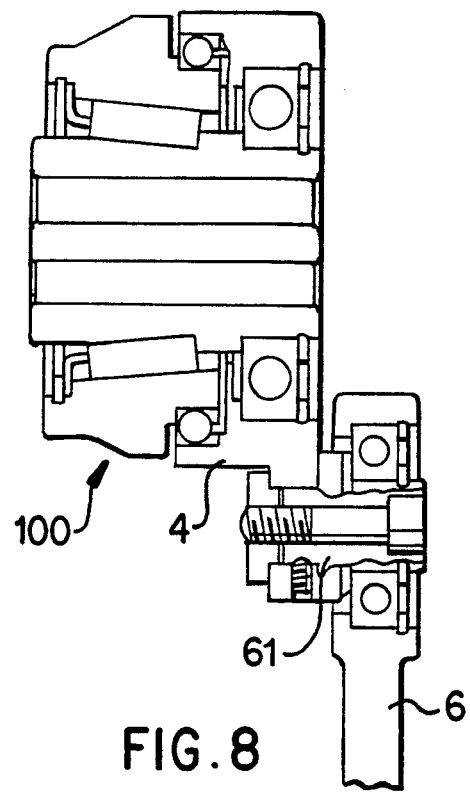
FIG. 8 is a sectional view showing a connecting part between an output connecting rod and a rolling bearing clutch.

Each of input shaft crank 3, 3 is provided with each crank pin 31, 31 and is fixed at each left and right side on an input shaft 1 which is supported by a body frame 10 via bearings. Each input connecting rod 5, 5 is connected to each crank pin 31, 31 via each bearing at one end, and connected to each one end of each output connecting rod 6, 6 via each crank pin 51, 51 and each bearing at the other end. These rods are able to move freely in planes of which directions are the same to the rotation plane of the input shaft cranks 3, 3. The other end of each output connecting rod 6, 6 is connected to each input side member 4, 4 of each rolling bearing clutch 100, 100. An output shaft 2 operated as a common shaft of each clutch is rotated one direction only when each input side member 4, 4 is swung FIG. 8 shows detail of a connection part to connect the output connecting rod 6 to the rolling bearing clutch 100 through the input side member 4.

Each speed change link 7, 7 of which the swing center is each crank pin 71, 71 (the point Q in FIG. 7) is connected to each crank pin 51, 51. The crank pin 71 is connected to a ring 11 which is fitted to the body frame 10 rotatably about the input shaft 1 as the center and can be fixed at any optional point by being rotated on the body frame 10 through bearings, thus making available the stepless speed change. Further, as shown in the figure, since the ball bearings are used at main parts of the construction, the variable transmission is free from maintenance as for lubrication. And also, problems of backlash do not arise because a gear mechanism is not used.

Figure 9:
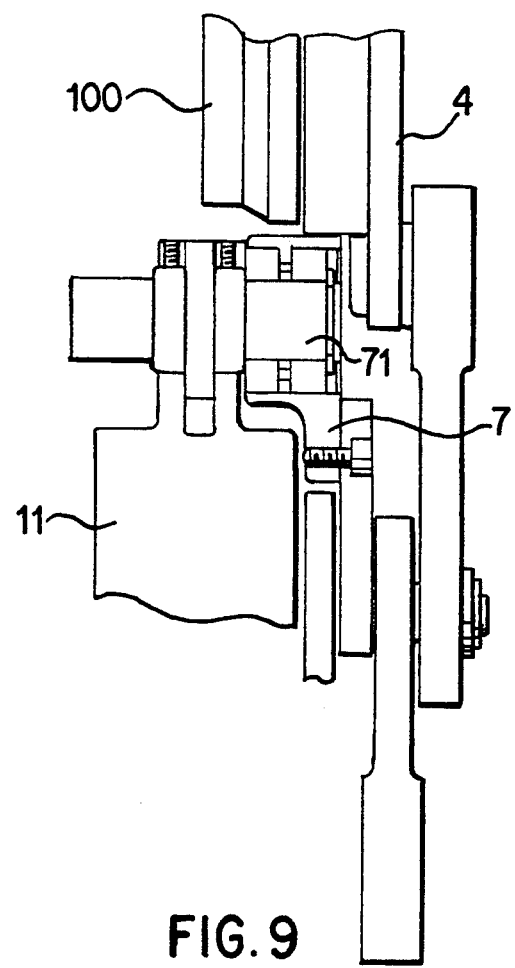
FIG. 9 is a sectional view showing a detail of a fitting part of a speed change link of the stepless speed change gear.

FIG. 9 shows a detailed construction of a fitting portion of the crank pin 71 of the speed change link 7 to the ring 11. By connecting the speed change link 7 and the ring 11 as shown in the figure, the support point Q for transmission can be shifted by rotating the ring 11. The shifting and fixing of the ring 11 is carried out by turning a lever 12 as shown in FIGS. 6 and 7. That is, the lever 12 is fixed at any point, by rotating a handle 13 to one direction to loose a friction member 14 from contacting to the body frame 10 with pressure, then by rotating the handle 13 to the other direction to push the friction member 14 to the body frame 10 with pressure. By such a method, the support point for speed change can be fixed at any point between Q and Q' (transmission range 70°). Accordingly, the ring 11 and the lever 12 are examples of the fixing means. However, other suitable methods may be adopted as fixing means, for example, a worm gear being engaged with a worm wheel which is provided at the circumference of the ring 11 except the above method as utilizing friction. Further, the fixing means may be operated remotely or automatically in order to control transmission ratio.

Furthermore, although the above embodiment has two sets of the rolling bearing clutches, the stepless speed change gear may be formed as a multi-stage unit having more than 3 clutches. By making a multi-stage unit, the output rotation is smoother.

It is explained now about the rolling bearing clutch which can be used for the stepless speed change gear of the present invention.

Figure 10:
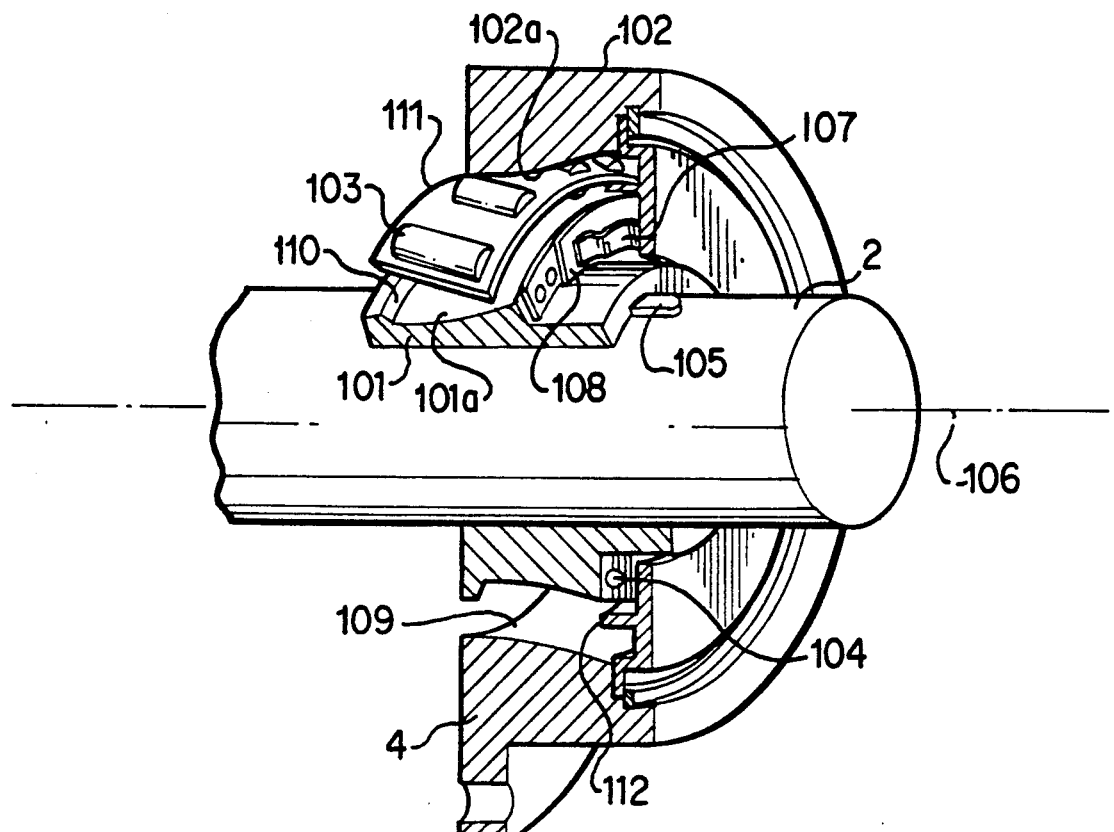
FIG. 10 is a perspective view of an illustrative embodiment of the rolling bearing clutch.
Figure 11:
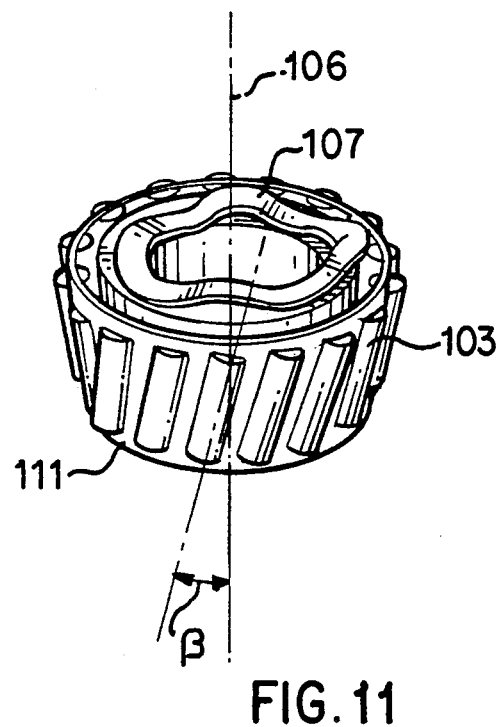
FIG. 11 is a perspective view of rollers and an inner ring parts of the rolling bearing clutch.
Figure 12:
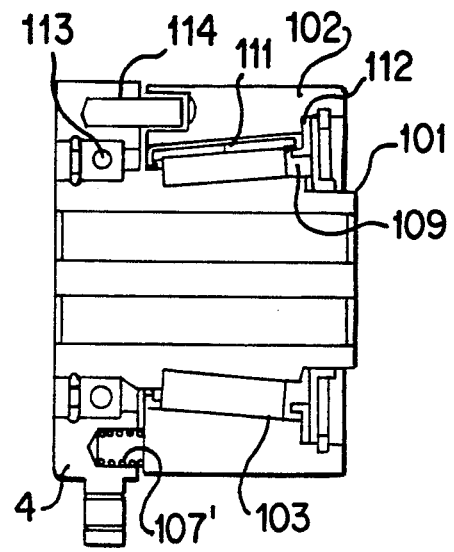
FIGS. 12, 13, 14(a), and 14(b) are sectional views of other embodiments of the rolling bearing clutch.
Figure 13:
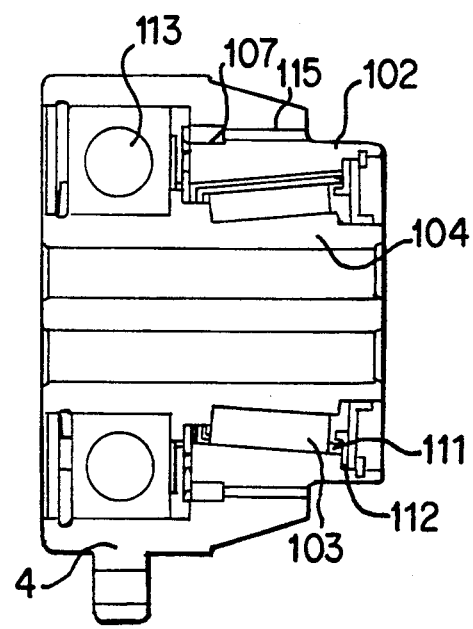
Figure 14A:
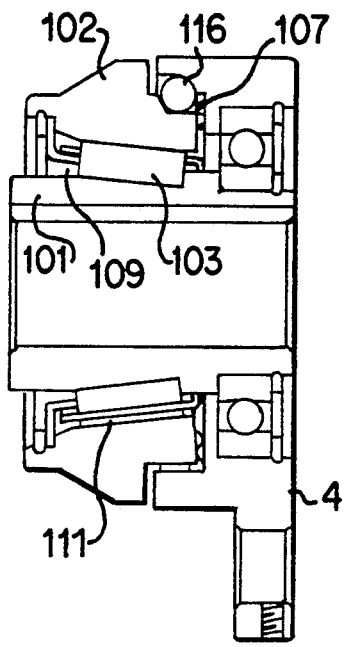
Figure 14B:
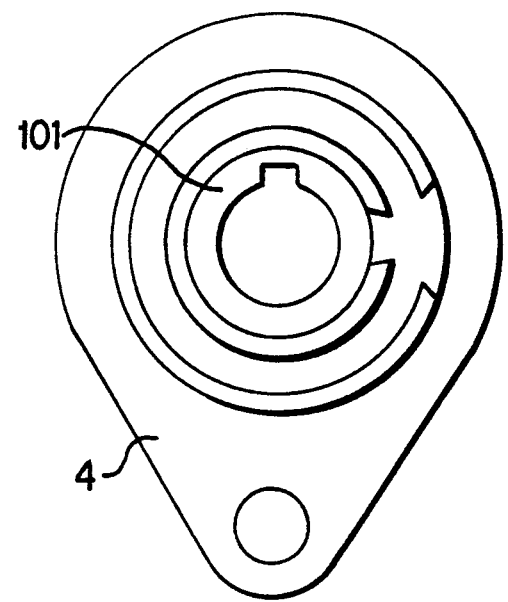

FIG. 10 shows general construction of the rolling bearing clutch and FIG. 11 shows a part of the clutch.

An inner ring 101 corresponding to the inner rotation body is movably on an output shaft 2 by a key engagement 105. An outer ring 102 corresponding to the outer rotation body is disposed facing the inner ring 101 to form a raceway 109.

A plurality of rollers 103 corresponding to the intermediate rotation body are, as shown in FIG. 11, disposed in the raceway 109 slanting to a plane including a center line 106 of the output shaft 2 at an angle of β (e.g. 15 degree).

The inner ring 101 is pushed by the outer ring 102 via a combination of a plate spring 107 and a spring retainer ring 108 as one example of the energizing means, to a direction to narrow the space of the raceway 109 (from right to left in the drawing). And, in this embodiment, since the outer ring 102 and the input side member 4 are constructed in one body, the rotation of the input shaft 1 is transmitted to the outer ring 102.

From the above configuration, in the free rotation (counterclockwise or left rotation of the outer ring 102 viewing from the right end side in the drawing), the rollers 103 which rotate to the left contacting with the inner and outer rings advance the inner ring 101 to the right direction against a energizing force of the plate spring 107, enlarging the space of the raceway 109. In other words, an action of the tapered screw will be produced between the inner and outer rings 101 and 102 via the rollers 103. The action will cause a right direction advancement of the inner ring 101 relative to the outer ring 102 based on the principle of unthreading of the screw, which enlarge the space of the raceway 109. As a result, the inner ring 101 can be freely rotated without causing wedge action of the rollers 103 between the raceway 109. Therefore, when the input rotation of the input shaft crank 3 of the stepless speed change gear shown in FIG. 6 is transmitted to the outer ring 102, only the outer ring 102 rotates without rotating the inner ring 101 and the output shaft 2.

Meanwhile, in this free rotation condition, the rollers 103 receive axial force of different strength from the inner and outer rings 101 and 102 in the opposite directions, which moves the rollers 103 in the axial direction. However, since the difference of the strength of the force produced by the inner or outer ring 101 or 102 is small, both the inner and outer rings 101 and 102 are provided with flanges 110 and 112 respectively as the annular member at opposite sides in the center line 106 to prevent the rollers 103 to disengage with the inner or outer ring.

On the other hand, in the reverse rotation condition (the outer ring 102 rotates clockwise viewing from right), the movement of the components are contrary to the above description: the rollers 103 rotate to the right, retreating the inner ring 101 to the left direction without advancing it. The compression force of the plate spring 107 moves the inner ring 101 to the left relative to the outer ring 102 to narrow the space of the raceway 109. The action causes the rollers 103 to be locked in the raceway 109 and a wedge effect is produced. As a result, the inner ring 101 and the outer ring 102 are clutched as soon as the reversal rotation is started. Thus the input rotation to the stepless speed change gear is transmitted to the output shaft 2 immediately, which is rotated at the predetermined changed speed. Therefore, high efficiency (more than 90% by the experiments) is obtained in the speed change with little heat generation.

In FIG. 11, the rollers 103 are arranged on the inner ring 101 slanting to a section including the center line 106 thereof by an angle of β, and the rollers 103 are retained in place by a retainer 111 to keep them off of each other. This configuration can prevent adjacent rollers 103, rotating in a same direction, from running against each other with relative tangential speed in an opposite direction, resulting in a smooth rotation of the rollers 103 and a smooth revolution thereof around the inner ring 101.

As described above, when torque is transmitted from the input shaft to the output shaft through the contact between the inner or outer ring and the rollers, they must be contacted in a line in order to transmit large torque for a long time under the condition of frequent clutching and de-clutching. Therefore, the rolling surface of the rollers 103 is cylindrical and the raceway surfaces 101a and 102a of the inner and outer rings 101 and 102 are a mono-hyperboloid of revolution about the center line 106 which are given by the following equations;

$$y_i^2/a_i^2 - x_i^2/b_i^2 = 1 \quad (5)$$

$$y_o^2/a_o^2 - x_o^2/b_o^2 = 1 \quad (6)$$

In the above equations, each notation means as follows: $x_i$ or $x_o$ means distance of the inner or outer raceway surface 101a or 102a from each small diameter end to the direction of the center line 106; $y_i$ or $y_o$ means distance of the inner or outer raceway surface 101a or 102a from the center line 106 in the optional section including the center line 106; $a_i$, $b_i$, $a_o$ or $b_o$ means a constant. Further, designating F as distance from the center line 106 to the center of the rollers 103 in the base face of the small diameter end of the inner and outer rings, r as the radius of the rollers 103 and β as the slanting angle, and assuming that F=9, t=1.5 and β=15° for example, each value of $a_i$, $b_i$, $a_o$ or $b_o$ in the above equations is calculated to be 7.5, 30.1, 10.5 or 37 respectively (calculation is not described because it is complicated. Thus, the shape of the mono-hyperboloid of revolution of the inner and outer raceway surfaces are decided.

The rollers may be conical shape or hourglass or convex drum shape which is symmetrical to its longitudinal center having a surface of mono-hyperboloid of revolution, instead of the cylindrical shape as mentioned above. In this case, both the inner and outer raceway surfaces are a mono-hyperboloid of revolution.

Although each of the rollers 103 is formed as one piece in the above embodiment, it can be divided into a plurality of pieces in its axial direction. Such configuration enhances the performance in the free rotation by enhanced skewness and reduced rolling resistance and increase adaptability for alignment and dimensional accuracy.

FIGS. 12, 13, 14(a), and 14(b) show other embodiments of the rolling bearing clutch, the inner ring 101 of which does not move in the axial direction.

A space between the inner and outer rings 101 and 102 is formed as a raceway 109 wherein cylindrical rollers 3 are retained by a retainer 111.

On one end of the inner ring 101 where there is one end side of the outer ring 102, a housing 4, as the input side member of the stepless speed change gear, is disposed via a thrust bearing 113. The housing 4 is mounted on the inner ring 101 through a thrust bearing 113 fixedly in the axial direction and rotatably. Further, the housing 4 is so connected to the outer ring 102 as to rotate integrally therewith through torque transmission means such as a torque transmission pin 114 (FIG. 12), an involute spline 115 (FIG. 13), ball spline 116 (FIG. 14(a)), etc. A coil spring 107 or a plate spring 107 corresponding to a pre-compression spring as energizing means is provided between the housing 4 and the outer ring 102, delivering pre-compression force to the outer ring 102.

Using of such construction that the inner ring 101 and the housing 4 do not move in the axial direction brings easy fitting of the stepless speed change gear both in its input and output sides. In this occasion, the clutching action is produced by arranging the outer ring 102 movably in axial direction.

By using the rolling bearing clutch as a one-way clutch as described above, wherein the rollers 103 are intentionally slanted to the plane including the center line 106 of the inner and outer rings, and rotates on their axis on the inner and outer raceway surfaces 101a and 102a maintaining stable line contact with them and also revolve around the center line 106, excellent load distribution can be obtained. In this case, even if there should be a dimensional error in the rollers 103, or variation in force previously applied by the plate spring 107 in the start operation, the rollers 103 can change their attitude so that all the rollers would participate in the carriage of the load, thus achieving automatically unified load distribution. Therefore, the clutch machined with a general machining accuracy can realize calculated load distribution, which brings unified clutching between the inner and outer rings through all of the rollers.

Further, the rollers 103 function as rolling members of a bearing by their rotation and revolution in the free rotation, while they operate immediately for clutching under the action of the energizing means and their automatic aligning action in the reverse rotation. Therefore, if there should occur deformation of the inner and outer raceway surfaces or wear of rollers or raceway surfaces due to frequent on/off operation of the clutch, the inner ring 101, the outer ring 102 or the rollers 103 can change their axial situations without affecting the clutch operation. Accordingly, it is not necessary either to increase the wall thickness of the inner and outer rings to ensure the rigidity for external or internal pressure added to the rings, or to pay special consideration against the wear, thereby realizing a clutch which is light in weight, compact in construction and long in service life. As a result, high output can be transmitted steadily in the stepless speed change gear of small size.

Furthermore, since each of the rollers of the rolling bearing clutch has a circular radial section same as general roller bearings, the same equations and factors for them can be used for calculation of the allowable surface pressure of the clutch parts.

Figure 15:
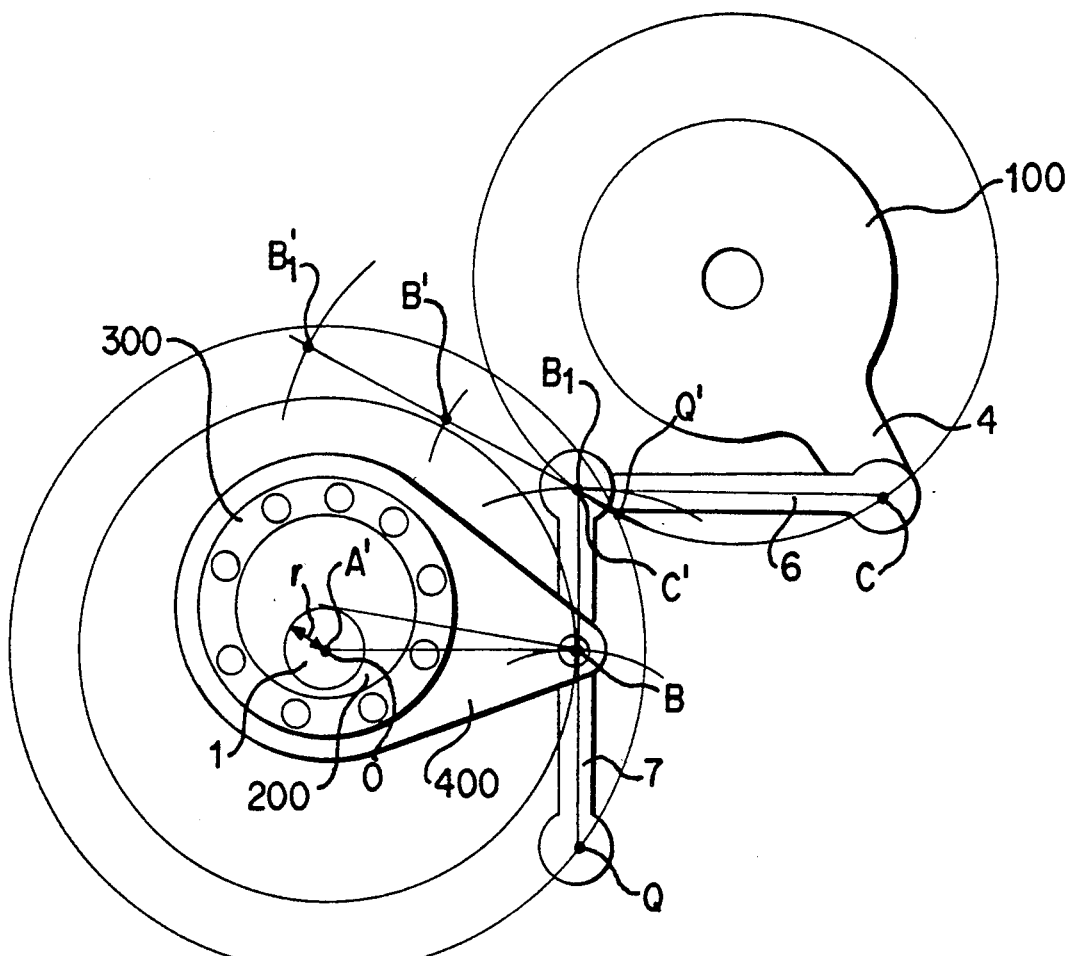
FIG. 15 is an explanatory drawing of a mechanism of the stepless speed change gear of another illustrative embodiment.

FIG. 15 shows a mechanism of another embodiment of the stepless speed change gear.

To the input shaft 1, a disk-like member 200 which has a center A' is fixed at an eccentric position with a distance r from the center O of the input shaft 1. A cam-like rotating member 400 is supported by bearings 300 rotatably at the circumferential surface of the disk-like member 200. The other end side connecting part of the rotating member 400 is rotatably connected to the other end side connecting part of a speed change link 7 at a point B. On the other hand, one end side of an output connecting rod 6 is connected to a second connecting part at a point $B_1$ which is in a different situation from the point B. From the above configuration, when the input shaft 1 is rotated, the disk-like member 200 rotates eccentrically. By this motion, the rotating member 400 is moved like a link connected to a crank having a radius r (corresponds to the input connecting rod 5 in FIG. 1), swinging the speed change link 7 around the support point Q for speed change as the center. In this case, since the output connecting rod 6 is connected at point $B_1$ as the second connecting part of the speed change link 7 in this embodiment, the displacement of the output connecting rod 6 becomes large with the ratio $QB_1/QB$, which changes the rotating speed of the output shaft 2 with the same ratio. Point $B_1$ may exist either at the inside or the outside of the point B in the line QB. The rotating speed of the output shaft 2 can be adjusted corresponding to that of the input shaft 1 by selecting the situation of the second connecting part in the above arrangement. Further, as the disk-like member 200 and the rotating member 400 are adopted in the above stepless speed change gear, the crank and the link mechanism are composed in one unit of rotation body, and simplified. Here in FIG. 15, each notation Q, B, C, or $B_1$ shows the position of the support point of the speed change lever or each connecting part respectively at the maximum speed change and Q', B', C' or $B_1'$ shows the same position at the minimum speed change.

As described above in detail, in the first invention of the present invention, since the input shaft and the output shaft are connected through the input shaft crank, the input connecting rod, the output connecting rod, the input side member, and the one way clutch in turn, and the other end side of the speed change link of which one end side is fixed at an optional position in the given moving range is connected to the same connecting part of the input connecting rod and the output connecting rod, the stepless speed change gear which is securely operable with simple construction can be provided.

In the second invention, since the displacement of the output connecting rod differs from that of the input connecting rod by connecting the input connecting rod and the output connecting rod at a different point on the speed change link, the rotational speed of the output shaft can be adjusted.

In the third invention, by adopting the disk-like member and the rotating member, the crank and the link are composed in one unit as the rotation body, which can simplify the mechanism.

In the fourth invention, since the other end side of the speed change link is moved in the range from where the movement of the input side member becomes maximum to where it becomes minimum, the speed change ratio from maximum to minimum can be obtained effectively.

In the fifth invention, since the rolling bearing clutch is adopted as the one-way clutch, unified load distribution can be achieved in the clutch without increasing the machining accuracy when the working condition changed by, for example, the change of external force applied to the clutch or the wearing of the rollers or the rings, by the functions of roller bearings in the free rotation condition and the clutching function with the self alignment operation of the rollers in the reverse rotation condition. As a result, a clutch which has large rated load, long service life and secured operation by smooth free rotation can be provided. Further, there is no need for installing additional bearings in the shaft because the clutch itself can be used as a bearing. Furthermore, the clutch can be operated not only under free rotation but also under frequent repetition between the free rotation and the reverse rotation with clutching operation by providing the annular members at both sides in the axis which stop the movement of the intermediate rotation bodies in the axis direction. As a result, the stepless speed change gear can be constructed in small size and light weight and has long service life even when transmitting large power.

Figure 16:
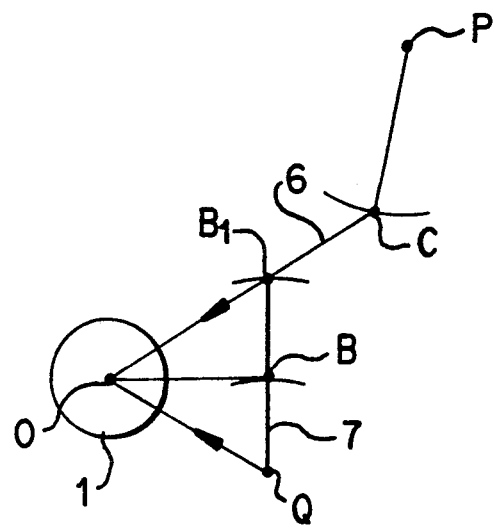
Figure 17:
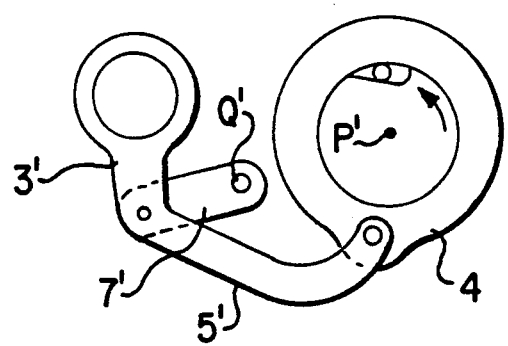
FIG. 17 is an explanatory drawing of the stepless speed change gear of one-way clutch type in the prior art.

FIG. 16 shows a method to direct force acting on the supporting point for speed change Q to the input shaft 1. By using such method, the force which is generated at the torque transmission and directing to the direction of the movement of the support point becomes small. This arrangement facilitates the movement of the support point. For this purpose, the relations of the positions of the center O of the input shaft, the support point of the speed change Q, the input point B from the crank, the driving point $B_1$ to move the output connecting rod 6 and the input point C to the one-way clutch 100 are decided to satisfy the equation:

$$\angle QOB = \angle B_1 OB$$

and also the condition that the point C is situated on the extended line of the line OQ. The support point Q is moved keeping the above relations. Further, the center point P of the one-way clutch 100 is decided to realize the above relation and also to be able to input the torque always from one direction. By such configuration, the force applied to the support point of speed change Q always directs to the point O from the balance of the vectors of the force applied to the speed change link 7 as shown in the figure, resulting in an extreme decrease of the force which directs to the moving direction of the support point.

As mentioned above in detail, the present invention provides the stepless speed change gear of small size, light weight and simple construction which attained stepless speed change from 0 to maximum with smooth action, and has very high industrial applicability.

I claim:

1. A stepless speed change gear comprising:
   an input shaft;
   an input shaft crank fitted to said input shaft at a right angle and provided with a connecting part;
   an input connecting rod connected to said connecting part at one end side and being provided with another end side connecting part;
   an output connecting rod connected to said other end side connecting part at one end side and provided with another end side connecting part;
   a one-way clutch to transmit torque in one direction only and being provided with an output shaft disposed in the same direction to said input shaft and an input side member being connected to said other end side connecting part of said output connecting rod at one end side swingably about a center of said output shaft;
   a speed change link connected to said other end side connecting part of said input connecting rod at one end side and positioned at an optional position in a given moving range at the other end side;
   fixing means to fix said other end side of said speed change link;
   said input connecting rod, said output connecting rod, said input side member and said speed change link being swingable in each plane a direction of which is the same as the direction of rotation of said input shaft crank;
   said other end side of said speed change link moving a given locus range from a position where said output connecting rod becomes substantially orthogonal to both said speed change link and said input side member to a position where said output connecting rod and said speed change link substantially line up in a straight line;
   said one-way clutch being a rolling bearing clutch comprising an inner rotation body, an outer rotation body, a plurality of intermediate rotation bodies and energizing means; said inner rotation body being provided with an inner raceway surface of a mono-hyperboloid of revolution about an axis of said output shaft; said outer rotation body being provided with an outer raceway surface of a mono-hyperboloid of revolution about said axis; said inner rotation body and said outer rotation body facing each other to form a raceway; said intermediate rotation bodies having cylindrical rolling surfaces and being disposed in the circumferential direction of said raceway with their center lines slanting at a predetermined angle to a section including said axis; the surface of each intermediate rotation body contacting in line with said inner and outer raceway surfaces; said energizing means energizing either said inner rotation body or said outer rotation body in the direction of said axis to narrow the spacing of said raceway; said inner and outer rotation bodies being provided with an annular member at an opposite side of said axis which brings the movement of said intermediate rotation bodies in said axial direction to a stop; said outer rotation body being connected to said input side member so that both rotate in one body; said inner rotation body being connected to said output shaft so that both rotate as one body.

2. A stepless speed change gear comprising:
   an input shaft;
   an input shaft crank fitted to said input shaft at a right angle and provided with a connecting part;
   an input connecting rod connected to said connecting part at one end side and provided with an other end side connecting part;
   an output connecting rod connected to said other end side connecting part at one end side and provided with another end side connecting part;
   a one-way clutch to transmit torque in one direction only and provided with an output shaft disposed in the same direction as said input shaft and an input side member connected to said other end side connecting part of said output connecting rod at one end side swingably about a center of said output shaft;
   a speed change link provided with a second connecting part at said one end side and said output connecting rod being connected to said second connecting part at said one end side and being positioned at an optional position in a given moving range at the other end side;
   fixing means to fix said other end side of said speed change link;
   said input connecting rod, said output connecting rod, said input side member and said speed change link being swingable in each plane a direction which is the same as the direction of rotation of said input shaft crank;
   said other end side of said speed change link moving a given locus range from a position where said output connecting rod becomes substantially orthogonal to both said speed change link and said input side member to a position where said output connecting rod and said speed change link substantially line up in a straight line;

said one-way clutch being a rolling bearing clutch comprising an inner rotation body, an outer rotation body, a plurality of intermediate rotation bodies and energizing means; said inner rotation body being provided with an inner raceway surface of a mono-hyperboloid of revolution about an axis of said output shaft; said outer rotation body being provided with an outer raceway surface of a mono-hyperboloid of revolution about said axis; said inner rotation body and said outer rotation body facing each other to form a raceway; said intermediate rotation bodies having cylindrical rolling surfaces and being disposed in the circumferential direction of said raceway with their center lines slanting at a predetermined angle to a section including said axis; the surface of each intermediate rotation body contacting in line with said inner and outer raceway surfaces; said energizing means energizing either said inner rotation body or said outer rotation body in the direction of said axis to narrow the spacing of said raceway; said inner and outer rotation bodies being provided with an annular member at an opposite side of said axis which brings the movement of said intermediate rotation bodies in said axial direction to a stop; said outer rotation body being connected to said input side member so that both rotate in one body; said inner rotation body being connected to said output shaft so that both rotate in one body.

3. A stepless speed change gear comprising:

an input shaft;

a disk-like member fitted to said input shaft at an eccentric position;

a rotating member supported rotatably on a circumferential surface of said disk-like member and provided with another end side connecting part;

a speed change link connected to said other end side connecting part of said rotating member and positioned at an optional position in a given moving range at the other end side;

an output connecting rod connected to said speed change link at one end side and provided with another end side connecting part;

a one-way clutch to transmit torque in one direction only and being provided with an output shaft disposed in the same direction as said input shaft and an input side member connected to said other end side connecting part of said output connecting rod at one end side swingably about a center of said output shaft;

fixing means to fix said other end side of said speed change link;

said other end side of said speed change link moving a given locus range from a position where said output connecting rod becomes substantially orthogonal to both said speed change link and said input side member to a position where said output connecting rod and said speed change link substantially line up in a straight line;

said one-way clutch being a rolling bearing clutch comprising an inner rotation body, an outer rotation body, a plurality of intermediate rotation bodies and energizing means; said inner rotation body being provided with an inner raceway surface of a mono-hyperboloid of revolution about an axis of said output shaft; said outer rotation body being provided with an outer raceway surface of a mono-hyperboloid of revolution about said axis; said inner rotation body and said outer rotation body facing each other to form a raceway; said intermediate rotation bodies have cylindrical rolling surfaces and being disposed in the circumferential direction of said raceway with their center lines slanting at a predetermined angle to a section including said axis; the surface of each intermediate rotation body contacting in line with said inner and outer raceway surfaces; said energizing means energizing either said inner rotation body or said outer rotation body in the direction of said axis to narrow the spacing of said raceway; said inner and outer rotation bodies being provided with an annular member at an opposite side of said axis which brings the movement of said intermediate rotation bodies in said axial direction to a stop; said outer rotation body being connected to said input side member so that both rotate as one body; said inner rotation body being connected to said output shaft so that both rotate in one body.

* * * * *